July 6, 1948.  L. P. MORTON  2,444,462
AUTO CHAIN
Filed June 4, 1947

Inventor
Lloyd P. Morton

By Clarence A. O'Brien
and Harvey B. Jacobson
Attorneys

Patented July 6, 1948

2,444,462

UNITED STATES PATENT OFFICE 2,444,462

AUTO CHAIN

Lloyd P. Morton, Great Falls, Mont.

Application June 4, 1947, Serial No. 752,454

3 Claims. (Cl. 152—242)

This invention relates to new and useful improvements in tire chains and the primary object of the present invention is to provide novel and improved means for coupling the cross chains to the side chains.

Another important object of the present invention is to provide a tire chain including means whereby the cross chains may be quickly and readily removed from the side chains for replacement or repair thereof.

A further object of the present invention is to provide a cross chain including unique latch means carried thereby that permit the same to be attached to a side chain in such a manner that there is no danger of either the cross chain or side chain becoming detached during service thereof.

A still further aim of the present invention is to provide a tire chain that is simple and practical in construction, strong and durable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
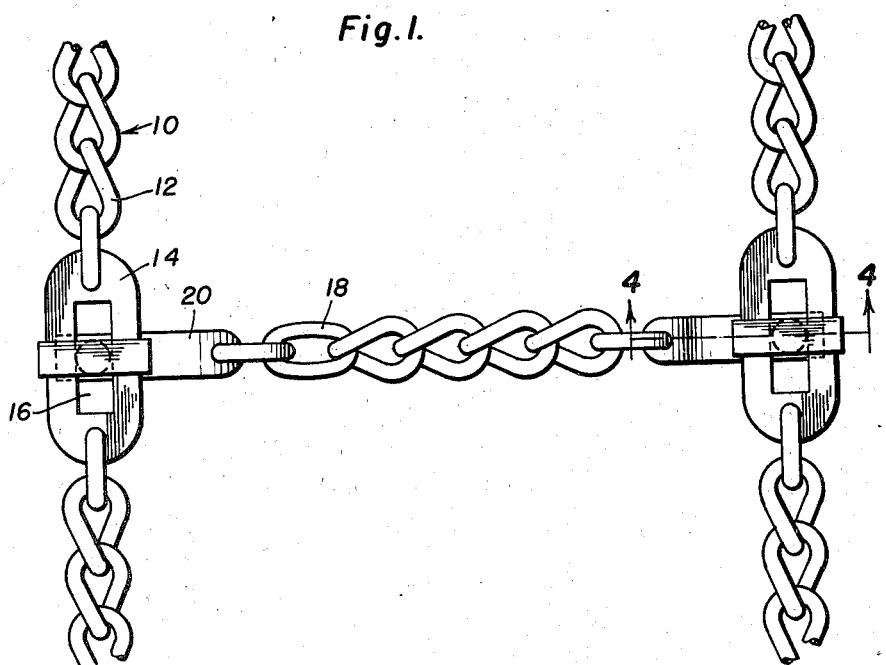
Figure 1 is a fragmentary plan view of the tire chain constructed in accordance with the present invention and with parts of the side chains broken away and shown in section.

Referring now to the drawings in detail, wherein for the purpose of illustration there is disclosed a preferred embodiment of the present invention, the numeral 10 represents a pair of side chains which are disposed circumferentially about a tire (not shown) and on both sides thereof.

Interposed at selected points with the links 12 forming the side chains, are substantially flat links 14 provided with rectangular apertures 16.

The numeral 18 represents a cross chain having flat substantially rectangular latch plates 20 pivotally secured at its terminal portions.

Integrally formed with the plates 20 and projected outwardly from substantially the centers of said plates are cylindrical spacing members 22 which are integrally formed with rectangular latch bars 24 that engage apertures 16.

Figure 2:
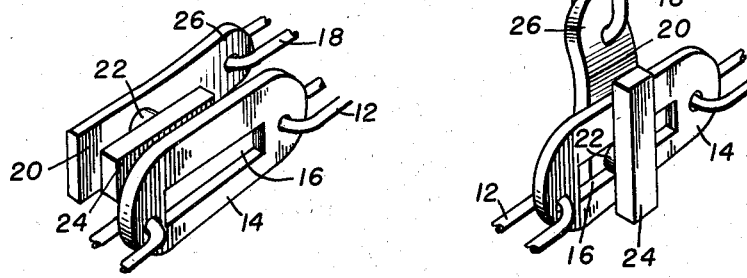
Figure 2 is a perspective view of the coupling members for the present tire chain in an uncoupled position.
Figure 3:
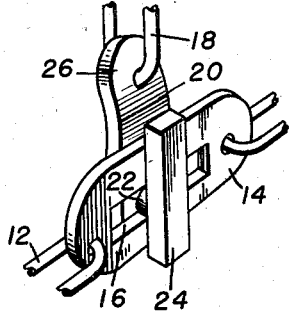
Figure 3 is a perspective view of the coupling members for the chain in a coupled position; and, Figure 4 is a transverse vertical sectional view taken substantially on the plane of section line 4—4 of Figure 1.
Figure 4:
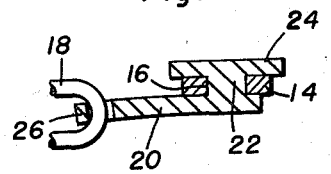

In practical use of the device, the latch plates 20 are placed opposite links 14, as shown in Figure 2, so that bars 24 may extend through the apertures. The plates 20 are then twisted so that the longitudinal axis of the bars 24 are disposed at right angles with the longitudinal axis of the apertures 16, see Figure 1.

The fixed ends of the latch plates are preferably turned outwardly, as at 26, to provide gripping means for convenience in coupling the plates to the links.

The use of such a fastening or coupling means between cross chains and side chains obviously permits the cross chains to be quickly and easily removed from the side chains whereby the parts may be conveniently packed for shipment or for replacement of one or more of the cross chains that have become worn from service.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A tire chain comprising circumferentially disposed side chains, flat links selectively disposed within said side chains, said links proposed with substantially rectangular openings therein, cross chains, substantially flat latch plates at the terminal portions of the cross chains, substantially rectangular latch bars carried by said plate, and a spacing member integrally formed with each plate and bar for spacing said bars relative to said plates.

2. A tire chain comprising circumferentially disposed side chains, links interposed in the side chains at selected points thereof and having substantially rectangular openings, cross chains, latch plates at the terminal portions of the cross chains, and substantially rectangular latch bars projecting outwardly from said latch plates for lockably engaging the openings in said links upon a twisting of said latch plates.

3. A tire chain comprising circumferentially disposed side chains, links interposed in the side chains having openings, cross chains, latch plates at the terminal portions of the cross chains, and latch bars projecting outwardly from said latch plates for lockably engaging the openings in said links, one end of said latch plates being bent outwardly from said latch bars for permitting engagement of said bar with said link.

LLOYD P. MORTON.

REFERENCES CITED

The following references are of record in the file of this patent:

UNITED STATES PATENTS

| Number | Name | Date |
|---|---|---|
| 2,182,439 | Kalbfell | Dec. 5, 1939 |
| 2,197,881 | Seaboe et al. | Apr. 23, 1940 |
| 2,244,600 | Banner | June 3, 1941 |